United States Patent Office 3,788,887
Patented Jan. 29, 1974

3,788,887
FIBER FLEECES AND SYNTHETIC LEATHERS
Harro Traubel, Leverkusen, Karl-Arnold Weber, Cologne, and Otto Koch and Klaus Konig, Leverkusen, Germany, assignors to Bayer Aktiengesellschaft, Leverkusen, Germany
No Drawing. Filed July 9, 1971, Ser. No. 161,351
Claims priority, application Germany, July 11, 1970, P 20 34 537.3
Int. Cl. C09d 5/00
U.S. Cl. 117—135.5                               8 Claims

ABSTRACT OF THE DISCLOSURE

Bonded fiber fleeces are provided and a method for their production which comprises preparing a reactive polyaddition reaction mixture from an organic polyisocyanate, and an organic compound containing at least two hydroxyl or amino hydrogen atoms capable of reacting with NCO groups as starting components in an inert liquid organic solvent for the starting components which boils at a temperature of below about 250° C. but which is a non-solvent for the polyaddition product, which solvent has no significant swelling effect on a homogeneous, non-porous film of the polyaddition product and is present in a quantity which does not exceed that which the polyaddition product is capable of enclosing as an internal phase, applying the reactive mixture to an unbonded fleece in a quantity sufficient to yield from 10 to 500% by weight based on the weight of the fleece of the polyaddition product and terminating the polyaddition reaction at a temperature of from about 20° to about 200° C. while evaporating the solvent.

---

The present invention relates to a process for the production of bonded fibre fleeces which are permeable to water vapor. These fibre fleeces will hereinafter be referred to as microporous fleeces. Another object of the invention is the production of synthetic leathers. The term is understood to mean a microporous fibre fleece which is equipped with a microporous covering layer which is permeable to water vapors.

It is known that fibre fleeces may be bonded by impregnating them with polymer solutions or dispersions and precipitating the polymers. Porous "breathing" fleeces may be obtained in this way. It has also been proposed to impregnate a fibre fleece with a solution of a polyamine, and after drying, dipping it into a solution of a polyisocyanate e.g. an "NCO-prepolymer," thus effecting fleece bonding by means of the polyurethane polyurea which forms in situ. NCO-prepolymer meaning a reaction product of a polyisocyanate and a compound having at least two active hydrogen atoms, which has unreacted terminal NCO-groups. In this process, polyisocyanate and polyamine react with each other in uncontrolled quantities. Polyurethane polyureas with optimal properties therefore cannot be obtained in this way.

The microporosity of fleeces which are bonded in this manner is also virtually impossible to adjust, i.e. porous fleeces are obtained only if the weight ratio of the binder to fibres is approximately 1:1. If more binder is made available to the fibre fleece, the porosity is reduced.

It is also known to introduce solutions of "NCO-prepolymers" and masked amines into a non-bonded fibre fleece effect formation of the polymer and subsequently to expel the solvent after the mixture has hardened. Expelling of the solvent in which the polyurethane formed has to be soluble causes porosity by expanding the polymer to form a foam. In this process, a decisive factor is the time at which the expulsion takes place. If the solvent is expelled at a time when the polyurethane has not yet sufficiently solidified then the foam collapses. If solidification has proceeded too far, then the pore formation is irregular. Moreover, the foams produced have mainly closed pores. None of the above mentioned processes enables specified quantities of binders or binders which have a specified structure to be prepared in the fleece, or to be introduced into the fleece, and at the same time to control porosity.

The conventional process of bonding fleeces with binders having good technological properties is carried out from relatively dilute organic polymer solutions or polymer dispersions. In this conventional process, the fibre fleece often has to be treated several times with the binder solution or dispersion with intermediate drying and finally polished on both sides in order to introduce the required quantity of binder into the fleece. The polishing dust which inevitably penetrates the pores reduces porosity. Owing to the necessarily high viscosity of these binder solutions or dispersions it is in most cases impossible to prevent the binder from becoming distributed anisotropically in the fleece. The fleece contains a higher amount of binder (compared with the quantity of fibres) near the surface than in the interior. Moreover, the binder tends to form a continuous film on the surface, and this film reduces the porosity of the sheeting. The process according to the invention, on the other hand, effects uniform penetration of the fleece material with the binder solution which initially has a low viscosity and which only becomes more viscous during the reaction, until finally the polyurethane is embedded in the fleece as a solid porous mass. The binder adheres very firmly to the fibres by chemical reaction, owing to the isocyanate groups which are present in large quantities at this stage.

Further objects of the invention are the formation of a porous sheet from a reacting mixture, application of an unbonded fibre fleece to this sheet while it still contains more than 10% and preferably more than 50% of the solvent originally present and bonding of the fibre fleece with the same or a similar reacting solution. The process thus enables production of the covering sheet, porous bonding of a fleece to the covering sheet without requiring an additional working step and bonding of the fleece itself to be carried out continuously and quite simply. The bonding of microporous sheets to substrates has hitherto been difficult because their porosity can be preserved only when the adhesive is discontinuous, in other words not iself in the form of a film. A discontinuous adhesive however, produces only a weak bond of the microporous film to the substrate. This critical step of bonding the fleece to the covering sheet is eliminated. In the present invention, penetration of the fibres of the fleece into the still soft covering sheet provides firm bonding of the fibres with the covering sheet and does not adversely affect microporosity.

Another object of the process consists in placing an unbonded fleece on a temporary support and then coating the fleece with a quantity of reacting solution sufficient to bond the fleece and form a continuous layer of microporous polyurethane on top of the fleece; the thickness of this layer can be varied as desired.

This process can, of course, be combined with the preceding process. In that case, a layer of the reacting mixture for forming a microporous sheet is applied to a temporary support. The fleece is then placed on this layer and coated with such a quantity of the reacting mixture that a continuous microporous sheet of polyaddition polymer is formed on the upper surface of the fleece. When the reaction has terminated and the solvent has been evaporated, the support may be stripped off and the structure produced may be split apart so that two microporous, bonded fibre fleeces each with its own covering layer are obtained.

The present invention thus relates to a process for the production of bonded fiber fleeces which comprises preparing a reactive polyaddition reaction mixture of an organic polyisocyanate and an organic compound containing at least two hydroxyl or amino hydrogen atoms capable of reacting with NCO groups as starting components in an inert liquid organic solvent for the starting components which boils at a temperature of below about 250° C. but which is a non-solvent for the polyaddition product, which solvent has no significant swelling effect on a homogeneous, non-porous film of the polyaddition product and is present in a quantity which does not exceed that which the polyaddition product is capable of enclosing as an internal phase, applying the reactive mixture to an unbonded fleece in a quantity sufficient to yield from 10 to 500% by weight based on the weight of the fleece of the polyaddition product and terminating the polyaddition reaction at a temperature of from about 20° to about 200° C. while evaporating the solvent.

The present invention also relates to a process for the production of bonded fiber fleeces as mentioned above in which the impregnated fleece is maintained at a temperature of from about 20° to about 200° C. for from about 10 to about 600 minutes, and wherein the reactive polyaddition reaction mixture is applied to the unbonded fleece in an amount sufficient to produce a continuous microporous covering layer of the polyaddition reaction product on the upper surface of the fleece. The present invention also relates to a process for the production of bonded fiber fleeces as mentioned above in which the reactive polyaddition reaction mixture is first applied to a substrate to yield a thin layer and the unbonded fleece is applied to the reactive layer within 0 to 1000 times the reaction time, in which the microporous layer is from about 5 to about 20µ thick and the unbonded fleece penetrates the layer to a depth of from about 1 to about 80% of its thickness, in which the unbonded fleece is applied to the microporous layer while the layer still contains more than 50% of the original quantity of solvent, in which the reactive polyaddition reaction mixture contains up to about 100% by weight based on the polyurethane weight of the polyaddition product of a highly polar solvent, and wherein the reactive polyaddition reaction mixture is applied to the unbonded fleece in an amount sufficient to produce a continuous microporous covering layer of the polyaddition reaction product on the upper surface of the fleece and the resulting sheeting is then split through the cross-section fleece layer after the polyaddition reaction has been terminated.

The reacting mixtures mentioned above are solutions of compounds used for polyurethane (polyurea) synthesis which are in the process of reaction and which are capable of forming microporous polyaddition products after hardening and removal of the solvent. Solutions of this kind have been disclosed e.g. in Belgian Pat. No. 715,003 (U.S. patent application Ser. No. 727,171), Belgian Pat. 705,612 (U.S. application Ser. No. 676,742), Belgian Pat. 719,272 (U.S. Pat. 3,582,396) and Belgian Pat. 725,052 (U.S. application Ser. No. 780,257).

The starting compounds for the process are known in the art. The NCO-containing compounds used are di- and polyisocyanates. NH$_2$-containing compounds used are amines, aminoalkanols and hydrazine and its derivatives. Suitable for use as compounds which contain OH groups are low molecular weight (about 18 to 500) and medium molecular weight (about 500 to 3500) glycols, polyethers, polythioethers, polyesters, polyetheresters, polyacetates, polyester amides and polysiloxanes. The compounds are reacted with each other by the one or two-stage process.

(1) ONE STAGE PROCESS

If the amine and/or hydroxyl reactants do not differ substantially from each other in their reactivity towards the isocyanate group, it is advantageous to use the one stage process. This means that all reactants including the di- or polyisocyanate are mixed together in the solvent without any pre-reaction and are reacted therein to form the polyurethane.

(2) TWO STAGE PROCESS

If the amine and/or hydroxyl reactants differ substantially from each other in their reactivity towards the isocyanate group, the more reactive compounds would react with the isocyanate first and form products insoluble in the organic solvent which precipitate and thus upset the formation of polyurethane. This happens for instance when compounds which contain NH$_2$ groups, especially amines and compounds which contain OH groups are to be connected with polyisocyanates. In such cases, one therefore uses a two stage process in which the less reactive constituent, e.g. the OH compound is reacted in a first stage with excess polyisocyanate to form a prepolymer still containing unreacted isocyanate groups. The prepolymer is then reacted in a second stage with the more reactive compound e.g. the amine, in an organic solvent.

In the simplest case a polypropylene glycol ether, for example, is reacted with a diisocyanate, e.g. hexamethylene diisocyanate, to form a prepolymer:

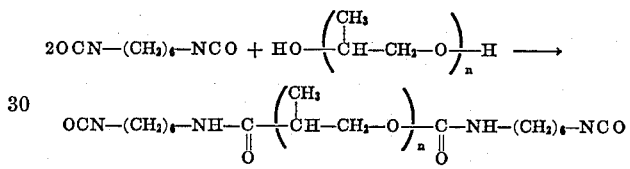

The prepolymer is reacted in the second stage with a diamine, e.g. ethylene diamine, to form a high molecular weight microporous polyurethane polyurea:

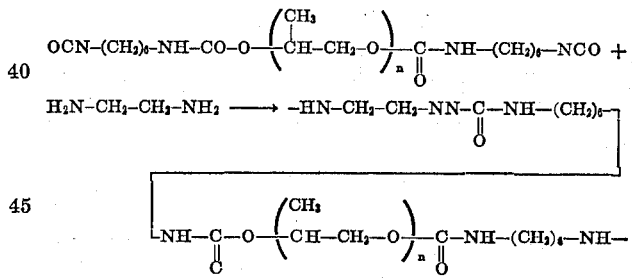

Polyurethane polyurea

Starting materials for the process according to the invention are medium molecular weight compounds (about 500-5000) which have at least two terminal OH groups, for example polyethers, polyesters, polycarbonates, polyacetates, polythioethers or polysiloxanes. Such products have been described, e.g. in J. H. Saunders and K. C. Frisch "Polyurethanes" I, New York (1962), pages 32 to 61 and in the literature cited there.

Especially to be mentioned as suitable materials for the process are polyesters of adipic acid and optionally mixtures of dihydric alcohols such as ethylene glycol, propylene glycol, butane-1,4-diol, hexane-2,5-diol, 2,2-dimethylpropane-1,3-diol, hexane-1,6-diol, 2-methylhexane-1,6-diol, 2,2-dimethylhexane-1,3-diol, p-bis-hydroxymethylcyclohexane, 3-methyl-pentane-1,4-diol or 2,2-diethylpropane-1,3-diol, and especially polyesters of adipic acid and diols or mixtures of diols which have 5 or more C atoms because polyesters of this type have a relatively high resistance to hydrolysis and, especially when diols which have alkyl radicals in the side chain are also used, they result in high elasticity at low temperatures in the end products. Polyesters which are obtained by the polymerisation of caprolactone on diethylene glycol with a narrow molecular weight distribution are also very suitable starting materials. Especially to be mentioned in this connection are polyesters which have been obtained from diphenylcarbonate and glycols.

Excellent polyurethanes and polyurethane ureas which are resistant to hydrolysis can be obtained from polyalkylene ethers, e.g. polypropylene glycols. Polytetramethylene ether diols are especially advantageous; these may also be present in the form of mixed polyethers.

Surprisingly, the process according to the invention can also be carried out with polyhydroxyl compounds which are miscible with water, e.g. polyethylene glycol ether diols, polyurethanes which have a high water uptake capacity being then obtained. Examples of low molecular weight chain lengthening agents which have at least two OH or NH groups are polyols, aminols and polyamines.

Chain lengthening agents should have a molecular weight of 18 to about 500, preferably 32 to 350. Apart from water, examples of suitable chain lengthening agents, optionally used as mixtures, are ethylene glycol, propylene glycol, butane-1,4-diol, hexane-1,6-diol, hydroquinone-bis-($\beta$-hydroxyethylether), p-xylylene glycol, ethylene diamine, propylene-1,2-diamine or -1,3-diamine, tetramethylene-1,4-diamine, hexamethylene-1,6-diamine, 2,2,4-trimethyl-hexane-1,6-diamine, 1-methyl-cyclohexane-2,4-diamine, 1-amino-3-aminomethyl-3,5,5-trimethyl-cyclohexane, 4,4'-diaminodicyclohexylmethane, bis-(aminopropyl)-piperazine or aromatic diprimary amines such as 4,4'-diamino-diphenylmethane, bis-2,2-(4-aminophenyl)-propane, 4,4'-diamino-diphenylsulphide, 4,4'-diamino-diphenylether, 1-methyl-2,4-diaminobenzene or araliphatic diprimary diamines such as m-xylylene diamine, $\alpha,\alpha,\alpha',\alpha'$-tetramethyl-p-xylylene diamine, 1,3-bis-($\beta$-aminoisopropyl)-benzene and diamines which contain sulphonic acid groups, e.g. 4,4'-diaminostilbene-2,2'-disulphonic acid or 4,(4'-diamino-diphenylethane-2,2'-disulphonic acid, ethylene diamine-N-butylsulphonic acid, hexamethylene-1,6-diamine-N-butyl-sulphonic acid, 1,6-diaminohexamethylene-3-sulphonic acid or their alkali metal salts, hydrazides such as carbodihydrazide, oxalic acid dihydrazide, malonic acid dihydrazide, succinic acid dihydrazide and addition products of ethylene oxide and propylene oxide with ammonia or with aliphatic or aromatic amines such as diethanolamine, triethanolamine, methyldiethanolamine or phenyldiethanolamine, the dyeability of the products of the process being enhanced by these addition products; furthermore, hydrazine, e.g. also in the form of hydrazine hydrate, methyl hydrazine and dihydrazines such as N,N'-diamino-piperazine.

Secondary diamines may also be used, preferably those which have a symmetrical structure such as piperazine or 2,5-dimethylpiperazine as well as 3,3'-dichloro- or 3,3'-dimethyl-4,4-(di-methylaminophenyl)-methane.

The usual polyisocyanates as described e.g. by W. Siefken, Liebigs Ann. Chem. 562, 75–136 (1949)) or higher molecular weight reaction products of the above mentioned compounds which contain OH groups and excess polyisocyanates, which reaction products contain at least two NCO groups per molecule (so-called prepolymers having an NCO:OH ratio$\geq$1.2) are also suitable for the process. Suitable polyisocyanates are especially the aliphatic, cycloaliphatic, araliphatic, aromatic and heterocyclic diisocyanates and mixtures thereof. Especially to be mentioned are diisocyanates which have a symmetrical structure, e.g. diphenyl methane-4,4'-diisocyanate, diphenyl-dimethylmethane-4,4'-diisocyanate, 2,2',6,6'-tetramethyl-diphenylmethane-4,4'-diisocyanate, diphenyl-4,4'-diisocyanate, diphenyl ether-4,4'-diisocyanate or their alkyl substituted, alkoxy substituted or halo-substituted derivatives; furthermore, toluylene-2,4- and -2,6-diisocyanate and their commercial mixtures, 2,4-diisopropylphenylene-1,3-diisocyanate, m-xylylene-diisocyanate, p-xylylene-diisocyanate and $\alpha,\alpha,\alpha',\alpha'$-tetramethyl-p-xylylene-diisocyanate; also, alkyl substitution or halosubstitution products of the above diisocyanates, e.g. 2,5-dichloro-p-xylylene-diisocyanate or tetrachloro-p-phenylene-diisocyanate, dimeric toluylene-2,4-diisocyanate, bis-(3-methyl-4-iso-cyanophenyl)urea or naphthalene-1,5-diisocyanate. A certain amount of aliphatic diisocyanates such as hexane-1,6-diisocyanate, cyclohexane-1,4-diisocyanate, dicyclohexylmethane-4,4'-diisocyanate, 1-isocyanato-3-isocyanatomethyl-3,5,5-trimethylcyclohexane or 2,2,4-trimethyl-hexane-1,6-diisocyanate may also be included and result in products which undergo very little discoloration on exposure to light. Diisocyanates such as $\omega,\omega'$-di-(isocyanatoethyl)-benzene or 1,2,3,4,5,6-hexahydrodiphenylmethane-4,4'-diisocyanate also yield products which undergo little discoloration in light.

Diphenylmethane-4,4'-diisocyanate, the isomeric toluylene diisocyanates and, in certain quantities, hexane-1,6-diisocyanate and dicyclohexylmethane-4,4'-diisocyanate are used for preference owing to their commercial availability and their general properties.

In the two stage process, the medium molecular weight polyhydroxyl compounds are reacted with the diisocyanates in a molar ratio of about 1:1.25 to 1:4.0 in the melt or in solvents which are inert towards isocyanates, e.g. tetrahydrofuran, dioxane or chlorobenzene, the reaction being carried out at temperatures of about 40° C. to 130° C., preferably at 70° C. to 100° C., and optionally in several stages, e.g. when several diisocyanates are used. The reaction times observed are such that the product obtained is a substantially linear prepolymer with terminal NCO groups which when reacted with approximately equivalent quantities of bifunctional chain lengthening agents yields a substantially linear elastomeric polyurethane or polyurethane urea.

If poly hydroxyl compounds of relatively low molecular weight are used, e.g. 750 to 1250, the reaction with the diisocyanate is preferably carried out with low NCO/OH ratios, e.g. 2.0:1 to 1.25:1, whereas if the polyhydroxyl compounds have a relatively high molecular weight, e.g. 1700 to 2500, the NCO/OH ratios are preferably high, e.g. 3:1 to 1.65:1.

In addition to the medium molecular weight polyhydroxyl compounds, low molecular weight diols (molecular weight preferably below 250), e.g. ethylene glycol, butane-1,4-diol, bis-N,N-($\beta$-hydroxyethyl)methylamine, bis-N,N-($\beta$-hydroxypropyl)methylamine, N,N'-bis-hydroxyethyl-piperazine or hydroquinone-bis-($\beta$-hydroxyethylether) may be added, for example in quantities of 10 to 300 mols per percent of the OH content, preferably 20 to 100 mols percent of the medium molecular weight polyhydroxyl compound. The use of diols which have tertiary nitrogen especially increases the dyeability, improves the light fastness and provides active points for subsequent aftertreatments such as cross linking e.g. with alkylating compounds such as 4,4'-dichloro-methyl-diphenylether.

The NCO group content of the prepolymers (based on the quantity of prepolymer free from solvent) is important in determining the properties of the polyurethanes obtained from the prepolymers. It should amount to at least 0.50 percent by weight and should preferably be from about 1.00 to about 7.6 percent by weight and in particular approximately 1.5 to 4.0 percent by weight in order that the polyurethanes may have sufficiently high melting points, tear resistance and elongation at break and stress values. If chain lengthening is carried out with water as the chain lengthening agent, the NCO content is preferably higher, e.g. between 3.5 and 7.6 percent by weight, because a part of the NCO groups is first formally saponified into amino groups.

The solvents used for the process according to the invention are advantageously organic compounds which boil at temperatures below 250° C. are liquid and do not react with the starting materials under the reaction conditions. Suitable solvents are e.g. aliphatic hydrocarbons such as pentanes, hexanes and their homologues, cycloalkanes which are optionally alkylated, such as cyclohexane, methylcyclohexane or cyclododecane, petroleum hydrocarbon fractions and especially mixtures of aliphatic hydrocarbons which have boiling points between 80° C.

and 250° C., e.g. ligroin, cleaning petrol, mineral spirits, mepasin, turpentine oils, mixed aliphatic-aromatic hydrocarbons such as tetralin or decalin, aromatic hydrocarbons such as benzene, toluene, xylene, ethylbenzene, diethylbenzene, or mesitylene, chlorinated hydrocarbons such as dichloro-, trichloro-or tetrachloromethane, dichloro-, trichloro- or perchloroethylene, dichloro-, trichloro-, tetrachloro-, pentachloro- or hexachloroethane, 1,2- and 1,3-dichloropropane, i-butyl chloride, dichlorohexane, chlorocyclohexane, chlorobenzene, chlorotoluene, ethers such as di-n-propylether, di - i - propylether, di-n-butyl ether, ethylpropylether, anisole, phenetole, esters such as diethylcarbonate, dimethylcarbonate, ethyl acetate, propyl acetate, butyl acetate, amyl acetate, hexyl acetate, methoxybutyl acetate, methylpropionate, ethyl propionate, methylglycolacetate and dimethyloxalate, and ketones such as acetone, methyl ethyl ketone, methyl-i-butylketone, methoxyhexanone, mesityl oxide, phorone, and cyclohexanone. The term "solvent" is understood to means a liquid which dissolves the starting material for polyurethane(urea) formation, but does not dissolve the polyurethane(urea) itself. A liquid which also dissolves the polyurethane is termed "polyurethane solvent."

The reaction of the starting compounds may be catalyzed with known isocyanate polyaddition catalysts (see J. H. Saunders and K. C. Frisch "Polyurethanes" I, New York (1962), p. 212). Preferably, volatile tertiary amines are used because, as is well known, they have the least detrimental effect on the resistance to hydrolysis of the end products.

The essence of this method of preparation is represented by the following requirements:

(1) The polyaddition is carried out in a solvent or solvent mixture in which the starting compounds used for polyurethane synthesis are soluble at the temperature employed for preparation;
(2) The solvent or mixture must not on its own have a significant swelling effect on a homogeneous, nonporous film of this polyurethane, and
(3) The quantity of solvent must not exceed the maximum quantity which the polyurethane is capable of enclosing as an internal phase in the course of the preparation.

With other words the polyurethane as continuous phase has incorporated the non-solvent or the non-solvent mixture for the polyurethane as dispersed phase in form of finely divided droplets.

During its preparation, the polyurethane becomes insoluble in the solvent as its formation progresses, so that pores are left over after removal of the solvent.

In view of the finished polyurethane the expressions "non-solvent," "no significant swelling effect" mean that the non-solvent or non-solvent mixture swell the polyurethane less than 50% by weight. Solvents for the finished polyurethane dissolve or swell the polyurethane more than 50% by weight, always based on the polyurethane.

The reaction may, of course, also be carried out in a solvent mixture which contains compounds which are capable of dissolving the polyurethane, but the solvent mixture itself always constitutes a non-solvent for the finished polyurethane. This method, however, generally only works if these polyurethane solvents have a lower evaporation number than the non-solvents, i.e. they must not escape before the non-solvents in the course of evaporation.

It has been found, however, that the non-solvent mixture may contain a minor quantity of such highly polar polyurethane solvents which have a higher evaporation number than the other solvents present may conveniently be used for improving the flow of the finished product without imparing the microporosity. The addition of highly polar polyurethane solvents in quantities of up to 100% (based on the polyurethane which is to be produced), but preferably 5 to 80%, improve the flow of film which is being formed. Examples of such highly polar polyurethane solvents are N,N-dimethylformamide, N,N-dimethylacetamide, trichlorobenzene, dimethylsulphoxide, tetramethylurea and camphor.

The quantity of solvent used governs the degree of porosity achieved. As the quantity of solvent increases, the permeability to water vapor passes through a maximum.

Thus if non-porous coating of the fleece is desired it is only necessary to use smaller quantities of these solvents. Another way to obtain non-porous coatings is to start with solvents which at the same time are swelling agents for the polyurethane. The process of this invention thus yields coatings of any desired water vapor permeability e.g. from 0.1 (which generally is regarded as homogeneous) to over 20 (highly porous) mg./cm.$^2$/h. The bonding of the fleece can also be effected with different porosities. For reasons of look and of feel preferably those starting mixtures will be applied which yield porous polyurethanes.

If phase reversal takes place, i.e. if the polyurethane is no longer capable of enclosing the solvent as a continuous phase but becomes dispersed in the solvent, porous products which are unsatisfactory in their appearance are frequently obtained.

Any desired degree of permeability to water vapor can easily be predetermined by a test series with increasing quantities of solvent and by measuring the porosity of the resulting films. The result is represented in a graph from which the quantity of solvent required for any given degree of permeability to water vapor can be read by plotting the quantity of solvent against the permeability to water vapor.

Any fleece which can be manufactured by known methods is suitable for the process. Fleeces produced by different methods include carded fleeces, fleeces obtained by pneumatic methods, spun fleeces and fleeces which are produced by wet methods, e.g. in a paper machine. Woven fabrics, knitted fabrics and natural materials such as split or corrected grain leather are suitable under certain conditions. The fleece is best placed on the covering layer while the covering layer still contains more than 50% of the original quantity of solvent. If very firm bonding between the fleece and the covering layer is desired, the fleece is placed on the covering layer while the covering layer is still capable of deformation so that the fleece sinks in slightly i.e. the fleeve penetrates the covering layer to a depth of 1 to 80% and preferably 10 to 30% of the thickness of the covering layer. The unbonded fleece must be placed on the covering layer within 0 to 1000, preferably 1 to 500 and more particularly 15 to 50 times the "reaction time" of the reaction solution. The "reaction time" of the reaction solution is the time which elapses after the reactants have been mixed, stirred and if indicated, catalyzed and during which the solution can still be stirred without the application of high shearing forces. In other words, it is the time during which the reaction solution can still be reversibly deformed by mechanical means. The reaction time "0" of the reaction solution means that immediately after mixing, the fleece is placed on the covering layer. After the reaction solution has started to become cloudy, which in a two-stage process generally occurs after the addition of the chain lengthening agent (generally polyamine) to the prepolymer solution and in the one stage process generally occurs after the addition of the catalyst to the solution which contains the medium molecular weight components having at least two OH groups (e.g. polyester), polyol (e.g. butane diol) and polyisocyanate (e.g. 4,4'-diisocyanato-diphenylmethane), the solution is poured on to a temporary support, and the fleece is applied to it preferably within 1.5 to 50 times the stirring time. The polyaddition reaction can now be completed with evaporation of the solvent. Bonding of the fleece may be effected at any time but the fleece is preferably treated immediately thereafter with the solution of binder, which may be identical with that used for preparation of the covering layer, and the polyaddition is completed at 20° C. to 200° C., preferably at 60° C. to 150° C. and more particularly to 80° C. to 120° C., under conditions in which the solvent evaporates.

The fleeces may be produced from polyester, polyamides, polyacrylonitrile, polyvinyl chloride, polyvinyl acetate, polyvinyl alcohol, cotton, rayon, collagen, regenerated celulose fibres, polyurethane or mixtures of these substances. If the fleece contains fibres which swell in the solvents present in the reaction solution, it is advisable to wet the fleece with the solvent or mixture before it is processed.

The process can be carried out as follows:

(1) A very thin film (e.g. 5 to $20\mu$) is applied as a finish to a temporary support such as a separating paper, a support coated with polyolefine, silicone or polyperfluoroalkylene, a steel strip or a silicon rubber matrix. Suitable polymers for this purpose are, for example, the polyurethane latices described by D. Dietrich et al. in Agnew. Chem. 82 (1970), pages 53–63, and in the literature cited there, or a polyacrylate, i.e. a product of the type suitable for preparing leather.

(2) After drying of the finish a microporous sheet is produced from a reaction mixture by the one-stage or two-stage process.

(3) The fleece, generally an unbonded fleece, is applied within 0 to 1000 times the reaction time.

(4) A reaction mixture is applied to the fleece by means of doctoring, spraying or casting or it may be distributed with a roller. The mixture may be identical with that of (2).

(5) Polyadidtion is terminated at a temperature of 20° C. to 200° C. and the solvents are evaporated.

(6) After 10 to 600 minutes, the finished artificial leather is removed from the temporary support.

(7) If necessary, the artificial leather is polished on the undersurface or a part of the fleece is split off.

(8) If desired, the artificial leather is impregnated.

(9) If step (1) has been omitted, the finished product may then be subjected to a finishing process. Steps 1 to 3 and 8 to 9 may be omitted if only bonded fleeces are to be produced.

Step 4 may be carried out by using sufficient solution to produce a continuous layer of polyaddition product also on the top surface of the fleece. It is immaterial for this purpose whether steps 1 to 3 have been carried out or not. The microporous layer 2 may be produced by the one stage of the two stage process.

(1) ONE STAGE PROCESS

The components which contain OH groups and optionally NH groups are dissolved in the solvent or solvent mixture, the polyioscyanate, which may also be dissolved, is stirred in at the required temperature, and the catalyst is added to the mixture if desired. The heat of reaction of the polyadidtion raises the temperature of the solution. The solution generally becomes cloudy after some time and the viscosity of the solution increases. The solution is then poured out on porous or non-porous supports. Gelling of the solution sets in after 20 minutes or less. Reaction mixtures which have longer gelling times may, of course, also be used but this is technologically of less interest. The polyaddition reaction is advantageously completed on the support at a drying cupboard temperature of more than 60° C., the film solidified in the process and the solvent evaporating at the same time and/or immediately thereafter. The reaction may also be carried out at lower temperatures, but the reaction time is thereby increased.

(2) TWO STAGE PROCESS VIA PREPOLYMERS

In the two stage process, a so-called prepolymer is prepared by known methods by reacting a dehydrated higher molecular weight compound which has at least two OH groups with excess polyisocyanate until the theoretical NCO content is obtained. The resulting prepolymer is dissolved in the solvert or solvent mixture and mixed with either a solid polyamine or a solution of polyamine. The mixture is shaped and polyaddition is completed with simultaneous removal of the solvent.

The composition of the starting materials for the microporous polyurethane must be such that a polyurethane which has a Shore hardness A of more than 50 kg. wt./cm.$^2$ and preferably over 200 kg. wt./cm.$^2$ when it is in the form of a homogeneous, non-porous structure and a softening range of over 100° C. and preferably over 130° C. is obtained. The Shore hardness A is determined according to DIN 53,505. The softening range can be determined in known manner, e.g. on a Kofler bench (see Houben-Weyl (1953) "Analytische Methoden" 789, 792). Suitable formulations for polyurethanes can be found in the literature, e.g. E. Müller et al. "Angewandte Chemie" 64 (1952), 523–531. If formulations which have not been described are to be used, it is advisable to prepare the polyurethane in bulk by the melt casting process or in dioxane and then to investigate its properties.

Polyurethanes which have the properties mentioned above can be obtained, for example, as follows:

(1) 1 mol of a linear or slightly branched compound of molecular weight 1500–2500 containing OH end groups.

(2) 0.5–4 mol of one of the usual polyurethane chain lengthening agents.

(3) Polyisocyanate at an NCO/OH ratio or NH ratio of 0.9–2.0.

These starting compounds (1–3) are reacted in the solvent mixture at a concentration of 10–90%. Higher amounts of polar compounds need usually larger quantities of solvent.

The reactivity of the higher molecular weight compounds which contain at least two terminal OH groups with isocyanates should not differ greatly from the reactivity of the crosslinking agent with isocyanate in the one stage process. The reactivities are preferably the same but the reactivity of the cross linking agent may be greater or smaller by a factor of up to about 5 and preferably 2. The reactivity is the reaction velocity constant in 1/mol sec. (see J. H. Saunders and K. C. Frisch "Polyurethanes" I, New York (1962), pp. 206 and 208).

Solvents suitable for the process according to the invention must dissolve the starting materials at the operating temperature. This can be determined by a preliminary test.

The non-solvent for the finished polyurethane used may only swell the finished polyurethane to such an extent that when e.g. a circular polyurethane film sample of e.g. 3 cm. in diameter and 0.2 to 0.5 mm. in thickness is placed in the solvent it takes up less than 50% by weight (based on the film sample) by swelling in 24 hours. One may, of course, also use mixtures of such non-solvents. In addition, the mixture may contain solvents which swell the polyurethane by more than 50% by weight. However, the evaporation time of such solvents must be at the most half that of the other non-solvents so that on drying they evaporate more quickly than these non-solvents. The evaporation time may be determined according to DIN 53,170.

The maximum quantity of solvent for the preparation of the polyadducts is determined by the capacity of the polyadducts to retain such solvents in the internal phase. The quantity of solvent actually used may be 30–100% and preferably 50–98% of the maximum quantity, depending on the extent to which the starting materials are lyophilic, the reaction temperature and the formulation. Films of various porosity can be obtained by varying the quantity of the solvent used within this range.

Solutions of starting material which have a concentration of less than 10 volumes percent of more than 98 volumes percent are of little technological value, especially since at excessively high dilutions phase separation often takes place as polyaddition proceeds and the solvent often separates as a serum after the shaping process.

In order to obtain a film which has sufficient microporosity, it is necessary for the reaction mixture to gel soon after it has been cast. Gelling is a gel-like solidification of the reaction mixture without phase separation, i.e. without separation of the solvent in the form of a serum. The sheeting generally cannot be deformed once it has gelled. After gelling, it becomes increasingly rigid due to progressive polyaddition.

The process permits the addition of other polymers, dyes, fillers, stabilisers, cross-linking agents, etc. in the form of solutions, organic dispersions or solids. These added substances are advantageously incorporated in the starting solutions.

One advantage of the process is its generally applicability as regards the starting components and solvents. The products obtained according to the process are produced in a simple manner without a large number of individual process steps, and the fleeces may be used as filter materials or, after application of a suitable covering layer, they may be used as synthetic leather. Products produced directly with a covering layer by this process constitute synthetic leathers which have a very smooth surface and excellent wearing properties.

Example 1

1000 g. of polyethylene glycol polyadipate (OH number 56) are dehydrated for one hour at 13 mm. Hg and 100° C. in a 2 l. beaker equipped with a stirring mechanism. 250 g. of 4,4′ - diisocyanato-diphenyl methane are then added at the same temperature with vigorous stirring. After 30 minutes at 110° C., the reaction mixture is cooled to room temperature and the NCO content is found to be 3.24%.

128 g. (100 mmol of NCO) of the prepolymer prepared as described above are dissolved in 15 g. of dimethylformamide, 100 ml. of chlorobenzene and 325 ml. of xylene at 100° C. 3 g. of lamp black pigment ground up in a polyether are added. A solution of 10 g. of 4,4′-diamino-diphenylmethane in 25 g. dioxane heated to 100° C. is added while the reaction mixture is stirred with a magnetic stirrer, aad the stirring is continued for 2 seconds. The reaction mixture is poured out on to a hot glass plate on to which an aqueous polyurethane dispersion containing ground lamp black pigment has previously been sprayed with a spray gun. After 35 seconds, a stitched fleece of 60% perlon, 30% polyacrylonitrile shrinking fibre having a 40% shrinkage at 100° C. and 10% regenerated cellulose is placed on the sprayed glass plate and light pressure is applied with a roller. The fleece was then bonded with a mixture containing a prepolymer which had been prepared as follows: 1500 g. of polyethylene glycol adipate (OH number 56) and 375 g. of polyethylene glycol polyadipate (OH number 178) are reacted after dehydration with 485 g. of a mixture of 65% of 2,4-toluylene diisocyanate and 35% of 2,6-toluylene diisocyanate for 45 minutes at 110° C. The prepolymer contains 4.57% of NCO.

152 g. of the prepolymer were dissolved in 160 ml. of chlorobenzene, 480 ml. of xylene and 16 g. of dimethylformamide at 100° C. A solution of 9.7 g. of 2,4-diaminotoluene in 25 g. of dioxane was added at a temperature of 100° C. and the mixture was stirred for 3 seconds and then poured on to the fleece. The mixture is distributed by means of a roller and excess reaction mixture is expressed. Poly-addition was completed at 100° C. with evaparation of the solvents.

After termination of the reaction, the material was stripped from the glass plate and tested. It has a dry, leather-like handle and smooth surface. It had a permeability to water vapor of 5.6 mg./h. cm.$^2$ (see IUP 15; "Das Leder" 12 (1961), 86–88) was able to withstand 200,000 folding operations in the Bally Flexometer (see "Das Leder" 8 (1957) 190), withstood a heat ironing test at 150° C. without damage as well as a heat friction test (see Pittard, Jour. Soc. Leather Trade Chem. 4 (20–125)) and provided the following results in the tensometer test (see IUP 13, "Das Leder" 12 (1961), pp. 304 to 306); linear elongation 25%, permanent elongation 7.5%, pressure 3 kg. wt./cm.$^2$.

Example 2

10.6 kg. of a pjartly branched polyethylene glycol adipate (OH number 59.2) and 1.8 kg. of di-(β-hydroxyethoxy)benzene-1,4-, are dissolved in 6 l. of chlorobenzene and 7 l. of xylene together with 160 g. of Solvent Black 3 C.J. 26.150 and 1.8 kg. of cyclohexanone and 30 g. of diazobicyclooctane at 100° C. in a 50 l. tank.

A solution of 4.1 kg. of 4,4′-diisocyanato-disphenyl methane in 20 l. of xylene was prepared in a second tank. The two components are fed into a mixing head by dosing pumps at a total output of 0.9 kg./min. and sprayed on to a steel strip which is at a temperature of 100° C. The steel strip moved at the rate of 1 mm./min. After 1½ meters a fleece consisting of a polyamide is applied continuously and pressed down lightly. Subsequently there was sprayed a solution continuously from a mixing head onto the glace which consisted of the same components as the mixture to give the film. The solution was distributed by means of a roller 40 cm. after the point at which it was sprayed on the fleece. After passage through a heating tunnel, reversal of the steel strip and removal of the fleece from the strip at the end opposite to that at which it had been applied (30 minutes after appjlication), the fleece was finally dried to completion in a heating cupboard with runners. Since the resulting product was rather thick, a layer 1.5 mm. in thickness carrying the covering layer was split off. The covering layer was found to have a resistance to separation of 3 to 6 kg./ 2 cm. The synthetic leather had a permeability to water vapor of 1.9 mg./h. cm.$^2$.

The fleece which had been split off had a thickness of 1–1.1 mm., a tensile strength of 71 kg. wt./cm.$^2$ (longitudinal) and 78 kg. wt./cm.$^2$ (transverse), an elongation at break of 45% (longitudinally) and 55% (transverse) and a resistance to tear propagation of 21 kg. wt./cm. (longitudinal) and 25 kg. wt./cm. (transverse) and a permeability to water vapor of 14.1 mg./h. cm.$^2$.

Example 3

47 g. of a fleece consisting of 55% polyyamide, 40% polyacrylonitrile and 5% regenerated cellulose was treated with a solution consisting of the following components: 54 g. of a prepolymer (from 500 g. of polypropylene glycol ether) (OH number 56) and 125 g. of 4,4′-diisocyanato-diphenyl methane (2.8% NCO) dissolved in 160 ml. of mineral spirits (an aliphatic hydrocarbon mixture boiling in the range of 160° C. to 196° C.) at 100° C. To this solution was added a solution of 2.4 g. of 2,4-diaminotoluene in 6 g. of dioxane and the resulting reaction solution was then stirred for 3 seconds and poured out on to the fleece. After squeezing the fleece lightly with a glass rod to remove excess moisture, the fleece was heated at 100° C. The bonded fleece was found to have the following properties: Flexometer >200,000 (without damage), tensile strength 42 kg. wt./cm.$^2$ (longitudinal) and 55 kg. wt./cm.$^2$ (transverse), elongation 70% (longitudinal), 66% (transverse), tear propagation resistance 9 kg. wt./cm. (longitudinal), 10 kg. wt./cm. (transverse), permeability to water vapor 13 mg./h. cm.$^2$.

Example 4

30 g. of the partly branched polyethylene glycol adipate from Example 2. 4.8 g. of di-(β-hydroxyethoxy)-benzene-(1,4), 4 g. of dimethylformamide and 72 g. of xylene were stirred to form a clear solution at 100° C. After the addition of 11 g. of 4,4'-diisocyanate-dephenylmethane and 0.1 g. of diazabicyclooctane, the reaction mixture was stirred for 8 seconds and then poured out on to a hot glass plate. After 240 seconds, a stitched fleece of 70% perlon, 20% perlon bifilar and 10% of a thermoplastic adhesive fiber of a copolymer of vinyl chloride and vinyl acetate was placed on the coated glass plate, and the fleece was then coated with a similar solution from above so that the solution stood over the fleece. After termination of the reaction and evaporation of the solvent, a thick product was obtained which was split apart to yield two artificial leather fleeces each with its own covering layer; both these pieces of artificial leather withstood 200,000 foldings in the Bally Flexometer without damage.

Example 5

Three times the quantity of reaction mixture used in Example 4 was poured over a fleece consisting of 100% polyester fibres (polyethylene glycol terephthalate) so that about 2 mm. of solution stood over the surface of the fleece.

After reaction of the components and evaporation of the solvents an articial leather was obtained. The water vapor permeability of this leather was 2 mg./h. cm.$^2$.

Example 6

81 g. (60 mmol/NCO) of a prepolymer of polyethylene glycol polyadipate and 4,4'-diisocyanato-diphenylmethane (according to Example 1) were dissolved in 25 g. of dimethyl formamide and 175 g. of xylene at 100° C. in a glass beaker with magnetic stirrer rod. 6 g. (60 mmol NH) of 4,4'-diaminodiphenylmethane in 9 g. of xylene were added with stirring, and after stirring for 4 seconds the mixture was poured out on to a glass plate. 120 seconds later, a fleece of polyethylene glycol polyperhydroterephthalate was placed on the coated glass plate. This fleece was bonded with a reactive mixture of the following composition: 60 g. (40 mmol NCO) of a prepolymer of 440 g. (1380 mmol OH) of polyethylene glycol adipate (OH number 178) and 174 g. (2070 mmol NCO) of hexamethylene diisocyanate-(1,6) in 300 g. of chlorobenzene (120 minutes at 110° C.; NCO content 2.83%) were dissolved in 60 g. of dimethylformamide and 230 ml. of xylene at 100° C. 11.3 g. of an aqueous solution of the addition product of ethylene diamine and propane sultone still containing 0.55 g. of hydrazine hydrate (80%) and 5 g. of dimethylformamide were introduced into this solution with vigorous stirring and the mixture was then stirred for 3 seconds and poured out onto the fleece. After heating, a microporous artificial leather fleece which had a permeability to water vapor of 1.5 mg./h cm.$^2$ and a water vapor absorption of 0.8% (increase of relative humidity from 65% to 86% within 6 hours) and which could withstand more than 200,000 foldings in the Bally Flexometer without damage was obtained.

We claim:

1. A process for the production of bonded fiber fleeces which comprises preparing a reactive mixture of an organic polyisocyanate and an organic compound containing at least two hydroxyl or amino hydrogen atoms capable of reacting with NCO groups as starting components in an inert liquid organic solvent for the starting components which boils at a temperature of below about 250° C. but which is a nonsolvent for the polyaddition product, of said starting component, which solvent has no significant swelling effect on a homogeneous, non-porous film of the polyaddition product and is present in an quantity which does not exceed that which the polyaddition product is capable of enclosing as an internal phase, applying the reacting mixture to an unbonded fleece in an quantity sufficient to yield from 10 to 500% by weight based on the weight of the fleece of the polyaddition product and terminating the polyaddition reaction at a temperature of from about 20° to about 200° C. while evaporating the solvent.

2. The process of claim 1 in which the impregnated fleece is maintained at a temperature of from about 20° to about 200° C. for from about 10 to about 600 minutes.

3. The process of claim 1 wherein the reactive polyaddition reaction mixture is applied to the unbonded fleece in an amount sufficient to produce a continuous microporous covering layer of the polyaddition reaction product on the upper surface of the fleece.

4. The process of claim 1 in which the reactive polyaddition reaction mixture is first applied to a substrate to yield a thin layer and the unbonded fleece is applied to the reactive layer within 0 to 1000 times the reaction time.

5. The process of claim 4 in which the reactive layer is from about 5 to about 20$\mu$ thick and the unbonded fleece penetrates the layer to a depth of from about 1 to about 80% of its thickness.

6. The process of claim 4 in which the unbonded fleece is applied to the reactive layer while the layer still contains more than 50% of the original quantity of solvent.

7. The process of claim 4 in which the reactive polyaddition reaction mixture contains up to about 100% by weight based on the polyurethane weight of the polyaddition product of a highly polar solvent.

8. The process of claim 4 wherein the reactive polyaddition reaction mixture is applied to the unbonded fleece in an amount sufficient to produce a continuous microporous covering layer of the polyaddition reaction product on the upper surface of the fleece and the resulting sheeting is then split through the cross-section fleece layer after the polyaddition reaction has been terminated.

References Cited
UNITED STATES PATENTS

| | | | |
|---|---|---|---|
| 2,955,056 | 10/1960 | Knox | 260—2.5 A |
| 3,082,611 | 3/1963 | Alvis et al | 260—2.5 A |
| 3,100,721 | 8/1963 | Holden | 161—190 |
| 3,328,225 | 6/1967 | Urbanic et al. | 161—190 |
| 3,461,103 | 8/1969 | Keberle et al. | 161—190 |
| 3,503,934 | 3/1970 | Chilvers | 161—190 |
| 3,565,982 | 2/1971 | Day | 161—190 |
| 3,582,396 | 6/1971 | Konig et al. | 117—135.5 |
| 3,360,394 | 12/1967 | Griffin et al | 117—63 |
| 3,567,499 | 3/1971 | Klebert et al. | 117—161 KP |
| 3,695,972 | 10/1972 | Lind et al. | 117—135.5 |

WILLIAM J. VAN BALEN, Primary Examiner

U.S. Cl. X.R.

117—161— KP; 156—77; 161—159, 170, 190, DIG. 2; 260—2.5 A

UNITED STATES PATENT OFFICE
CERTIFICATE OF CORRECTION

PATENT NO. : 3,788,887
DATED : January 29, 1974
INVENTOR(S) : Harro Traubel; Karl-Arnold Weber; Otto Koch It is certified that error appears in the above-identified patent and that said Letters Patent are hereby corrected as shown below:

Column 4, line 15, "connected" should read --coreacted--; same column, line 41, that portion of the formula which reads "NN" should be corrected to --NH--; same column, line 45, that portion of the formula which reads

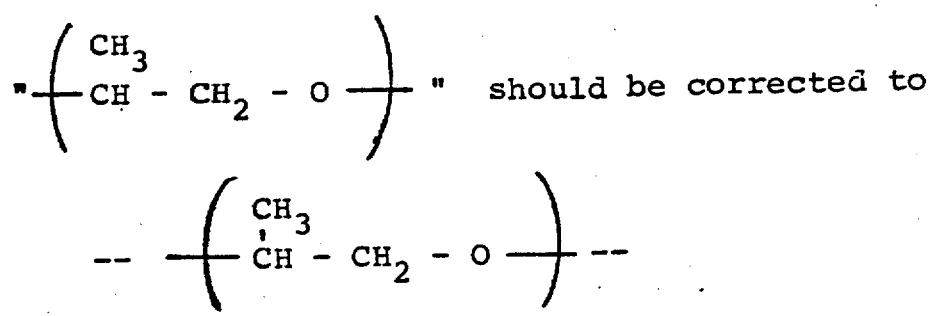

Column 5, line 34 "4,(4' " should read --4,4'--;

Column 8, line 49, correct the spelling of --fleece--;

Column 10, line 21, "Suitable formulations" should start a new paragraph;

Column 11, line 47, the spelling of --and-- should be corrected; same column, line 71, delete the hyphen so that --Polyaddition-- reads as one word;

Column 12, line 13, the spelling of --partly-- should be corrected same column, line 24 "1 mm./min." should be corrected to --1 m./min.--; same column, line 34, correct the spelling of --application--; same column, line 74, replace the period after "Example 2" with a comma;

Column 13, line 2, the spelling of --diphenylmethane-- should be corrected.

Signed and Sealed this eighteenth Day of November 1975

[SEAL]

Attest:

RUTH C. MASON
Attesting Officer

C. MARSHALL DANN
Commissioner of Patents and Trademarks